April 10, 1962 E. W. PARLASCA ETAL 3,029,094
FLEXIBLE PIPE COUPLING HAVING MEANS TO ACCOMMODATE
RADIAL DEFLECTIONS OR VIBRATIONS
Filed April 21, 1958 3 Sheets-Sheet 1

INVENTORS
Edwin W. Parlasca
Lucius B. Donkle, Jr.

By: Olson & Trexler
attys.

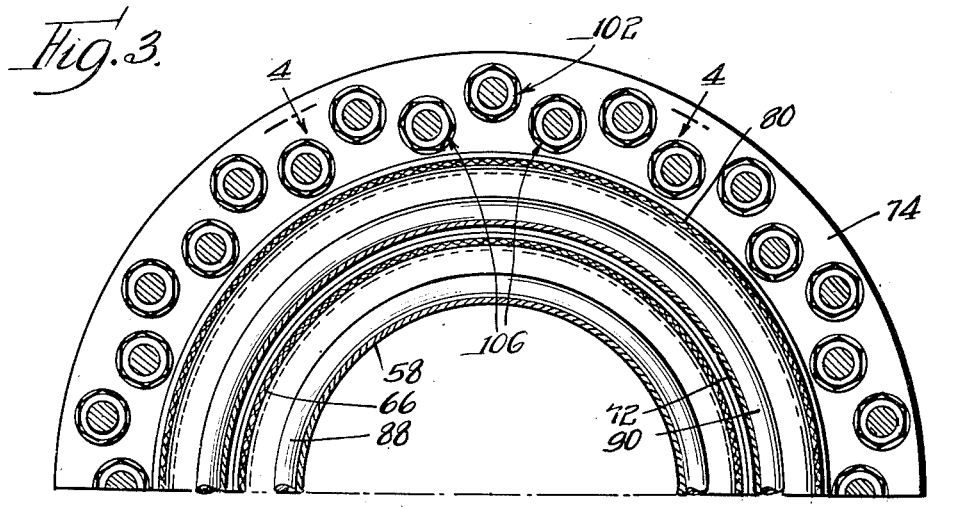
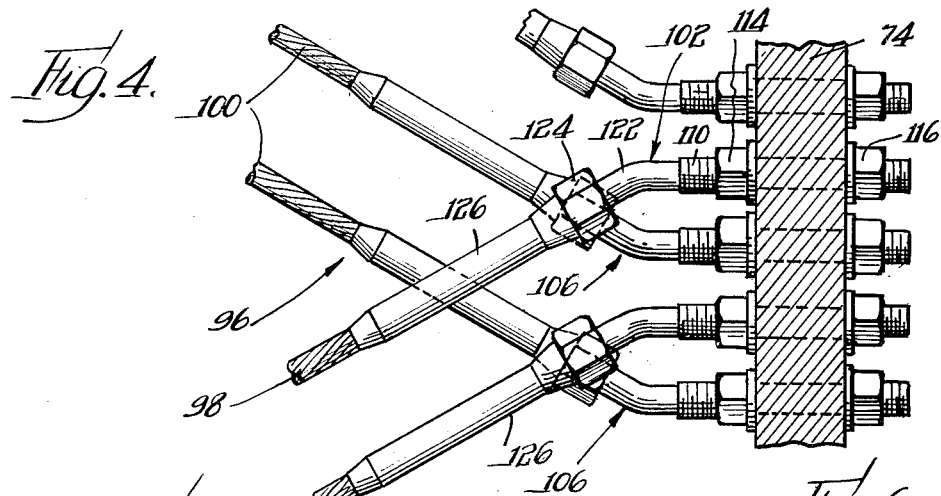
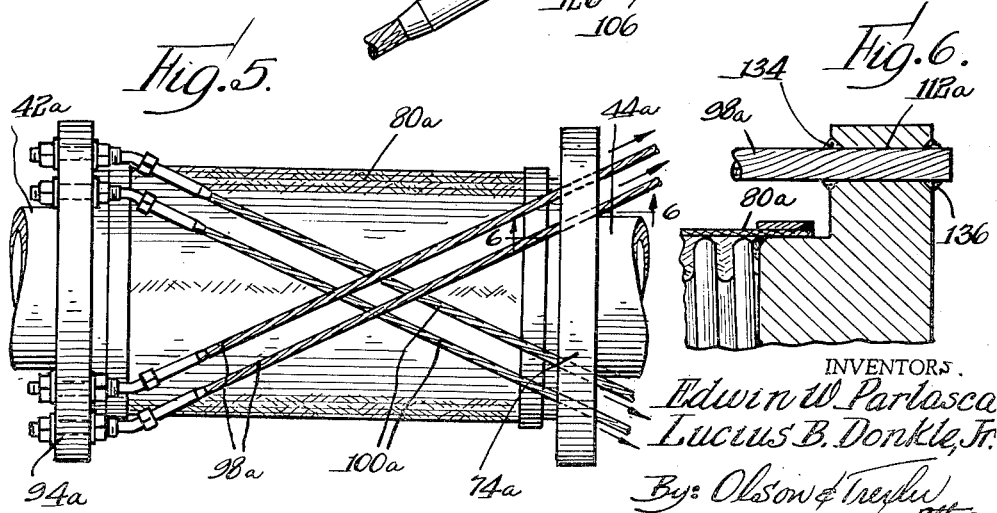

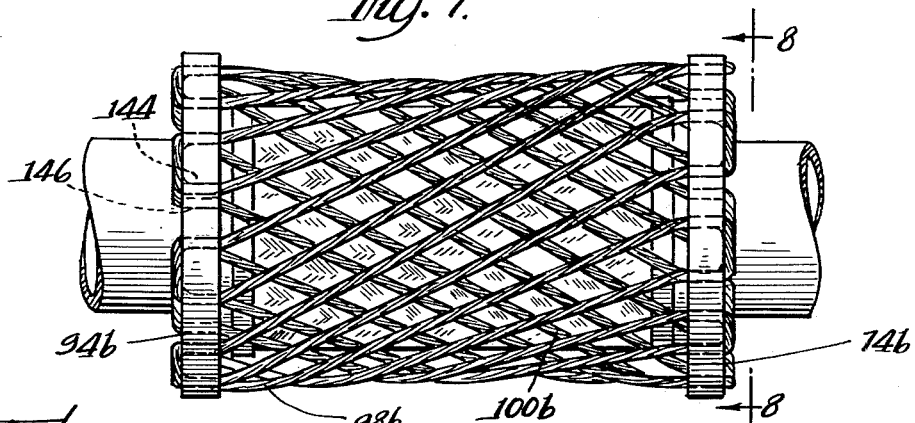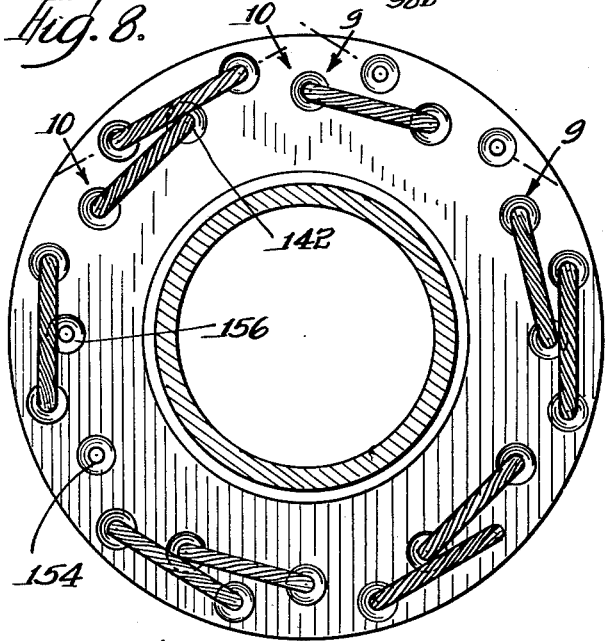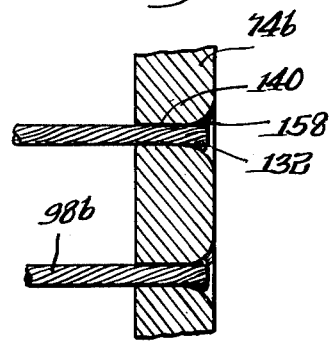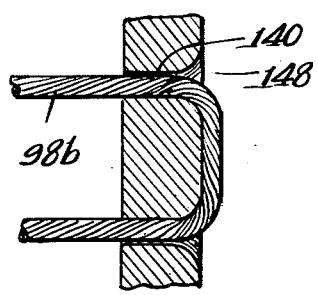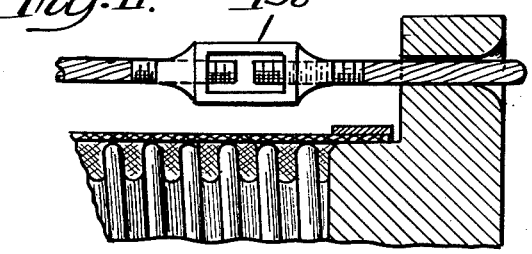

United States Patent Office 3,029,094
Patented Apr. 10, 1962

3,029,094
FLEXIBLE PIPE COUPLING HAVING MEANS TO ACCOMMODATE RADIAL DEFLECTIONS OR VIBRATIONS
Edwin W. Parlasca, Elgin, and Lucius B. Donkle, Jr., Wheaton, Ill., assignors to Flexonics Corporation, Maywood, Ill., a corporation of Illinois
Filed Apr. 21, 1958, Ser. No. 729,779
3 Claims. (Cl. 285—114)

The present invention relates to a novel flexible joint, and more particularly to a novel joint adapted to accommodate radial deflection or vibration in a piping system.

Numerous flexible joints or connectors have been heretofore proposed for use in various piping systems, but such heretofore proposed structures are frequently not entirely satisfactory for use in piping systems utilizing large pipe diameters and adapted to accommodate high internal pressures. As will be understood, flexible joints are frequently installed in a piping system having bends formed therein so that fluid pressure within the pipes tends to elongate the joint. Therefore, some means must be provided for, in effect, tying the opposite ends of the joint or connector structure together while at the same time permitting relative radial deflection of the opposite ends of the joint structure to accommodate vibrations or relative radial or lateral deflection of adjacent ends of the piping system. If, for example, an internal pressure of 1,000 p.s.i. is provided in a piping system utilizing 10 inch pipe, there would be a resulting end load of approximately 40 tons tending to separate opposite ends of the joint structure. Retaining means have heretofore been provided by braids, but known braid constructions are not suitable for accommodating the loads which may be involved in the larger piping systems, and other heretofore proposed devices such as hinges or gimbals are relatively massive and costly and are undesirable for use in installation involving appreciable radial vibration.

It is an important object of the present invention to provide a novel flexible joint structure which is especially suitable for use in connection with relatively large diameter piping systems and which is of light weight, economical and rugged construction.

Another object of the present invention is to provide a novel flexible connector which may be relatively easily installed and adjusted so as to obtain substantially equal distribution of the load on the various elements thereof so as to increase the efficiency of the joint structure and enable it to accommodate larger loads.

Still another object of the present invention is to provide a novel flexible joint structure having means for restraining opposite ends thereof constructed in a manner which enables the joint structure to accommodate radial deflections or vibrations while a generally uniform distribution of the load throughout the restraining means is maintained.

Other objects and advantages of the present invention will become apparent from the following description and the accompanying drawings wherein:

FIG. 3 is an enlarged fragmentary sectional view taken along line 3—3 in FIG. 2;

FIG. 4 is a fragmentary sectional view taken generally along line 4—4 in FIG. 3;

FIG. 5 is an elevational view showing a slightly modified form of the present invention;

FIG. 6 is a fragmentary sectional view taken generally along line 6—6 in FIG. 5;

FIG. 7 is a fragmentary side elevational view showing a connector incorporating another modified form of the present invention;

FIG. 8 is an enlarged sectional view taken along line 8—8 in FIG. 7;

FIG. 9 is a fragmentary sectional view taken along line 9—9 in FIG. 8;

FIG. 10 is a fragmentary sectional view taken along line 10—10 in FIG. 8; and

FIG. 11 is a fragmentary sectional view showing another slightly modified form of the present invention.

Figure 1:
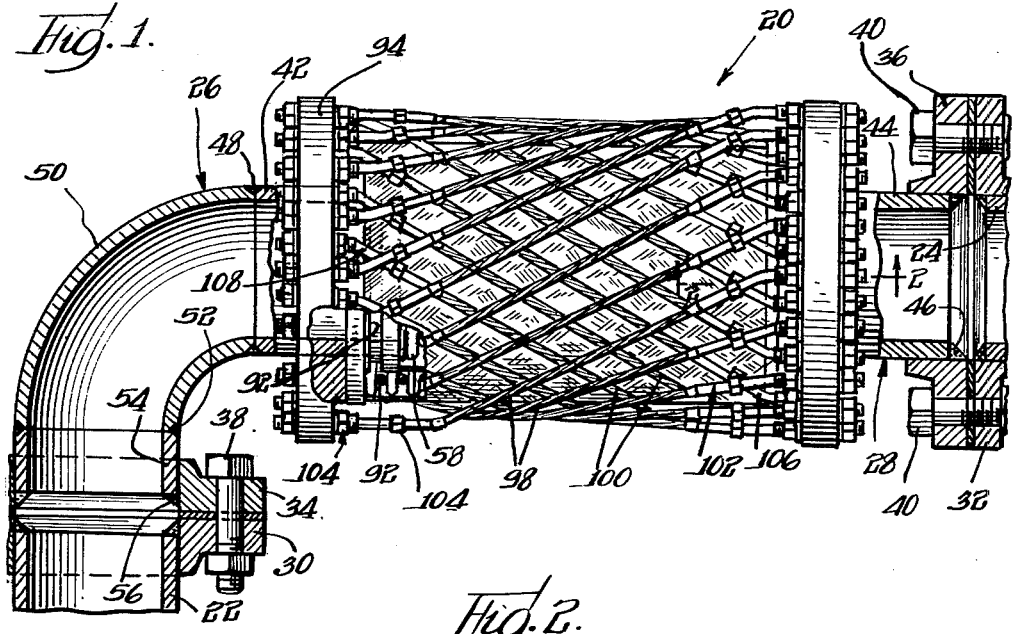
FIG. 1 is an elevational view partially broken away showing a joint structure incorporating features of the present invention assembled in a piping system.
Figure 2:
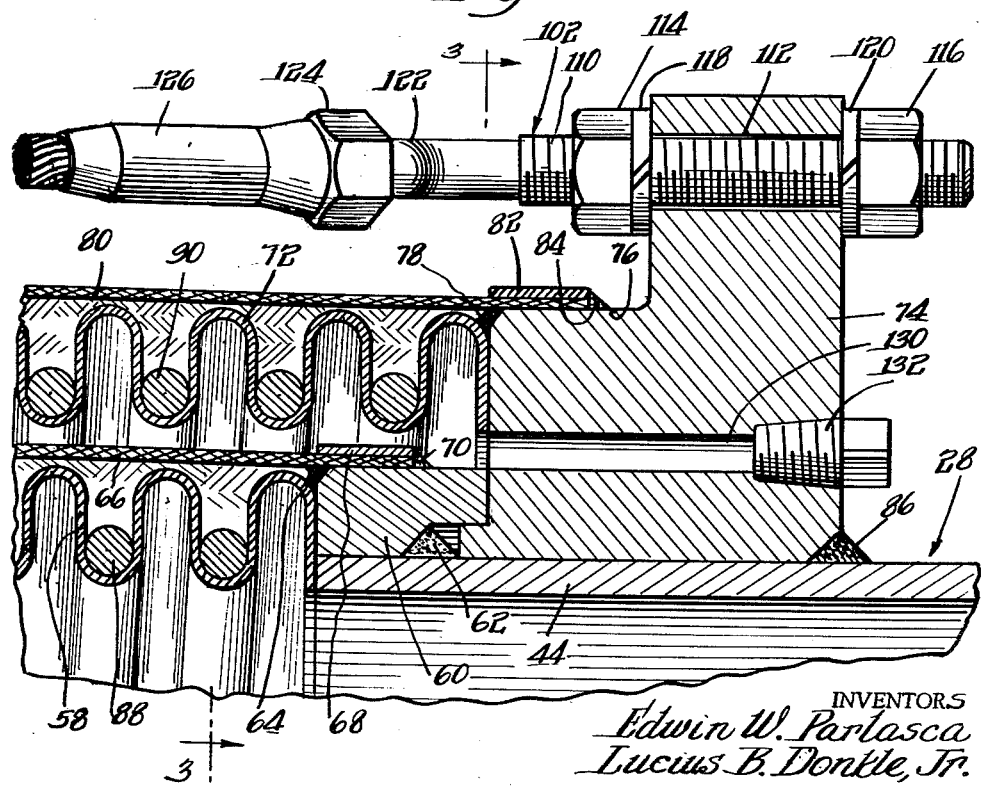
FIG. 2 is an enlarged fragmentary sectional view taken generally along line 2—2 in FIG. 1.

Referring now more specifically to the drawings wherein like parts are designated by the same numerals throughout the various figures, a flexible connector or joint 20 is shown in FIGS. 1 through 4, which flexible joint is adapted to be installed between pipe sections 22 and 24 of any suitable piping system. The flexible joint includes opposite end fitting means 26 and 28 which are adapted to be connected with the pipe sections 22 and 24 in any desired manner. In the embodiment shown, annular flanges 30 and 32 are respectively welded to the pipe sections 22 and 24 and complementary annular flanges 34 and 36 are welded to the end fitting means 26 and 28. The flanges 30 and 34 are detachably secured together by means of a plurality of annularly arranged bolts 38 of which only one is shown. Similarly arranged bolts 40 are provided for securing the flanges 32 and 36 together.

The opposite end fitting means 26 and 28 include substantially axially aligned pipe sections 42 and 44. The above mentioned flange 36 is annularly welded as at 46 directly to the pipe section 44. However, in the embodiment shown, the pipe section 42 of the end fitting means 26 is annularly welded as at 48 to an elbow 50 which in turn is annularly welded as at 52 to a short pipe section 54. The flange 34 is welded as at 56 to the short pipe section 54. It will be appreciated that the elbow could be omitted from the fitting means 26 or, if desired, the fitting means 28 as well as the fitting means 26 could be provided with an elbow.

Extending between and in axial alignment with the opposite end fitting means 26 and 28 there is a flexible corrugated tube 58. This tube is preferably formed with helically disposed corrugations for the purpose set forth below. The manner in which the corrugated tube 58 is secured to the end fitting means 28 is shown in detail in FIG. 2. More specifically, an annular adapter ring 60 is assembled over the pipe section 44 substantially flush with the inner end thereof and is annularly welded thereto as at 62. The outside diameter of the adapter member 60 is slightly greater than the maximum diameter of the corrugated tube 58. Thus an annular weld 64 may be provided between the periphery of the end face of the adapter member 60 and the crest of an adjacent convolution of the corrugated tube 58 for securing and sealing the tube to the end fitting means.

In many installations it may be desirable to provide the joint structure with an outer helically corrugated tube 72 surrounding the inner tube. The outer corrugated tube provides a secondary pressure seal so that in the event of a leak occurring in the inner tube 58, operation of the piping system need not immediately be suspended and personnel in the vicinity of the joint structure will be protected from the fluid flowing through the piping system. In other words, there must be a simultaneous failure of two corrugated tubes before the joint structure will become inoperative.

A braided sheath 66 of known construction loosely encircles the corrugated tube 58 and has an end portion telescoping over the adapter member 60. A metal band 68 extends around this end portion of the sheath for clamping the sheath to the adapter member, which metal band and sheath are annularly welded to the adapter member as at 70. The sheath 66 serves to keep the corrugated tube 58 from squirming under pressure and to protect it from abrasive or other damage that could result from contact with the outer corrugated tube.

The fitting means 28 is provided with a large annular flange member 74 having a reduced diameter portion 76 at its axially inner end. The diameter of the portion 76 is slightly greater than the outside diameter of the corrugated tube 72 and the tube is secured to this portion of the flange member by an annular weld 78. A protective sheath 80 is provided around the corrugated tube 72, which sheath is retained against the reduced diameter portion 76 of the flange member by means of a clamping band 82 and an annular weld 84. The flange member 74 is annularly welded to the pipe section 44 as at 86.

As will be understood, the corrugated tubes have the greatest strength and resistance to internal pressures within the transversely curved crest portion of each corrugation. In order to reinforce the root portions of the corrugations, a rod 88 is tightly helically wound into the valleys between the corrugations of the tube 58 and a similar rod 90 is tightly wound between the corrugations of the tube 72. These rods have their opposite ends welded to the opposite end fitting means so that they serve to restrain the tubes against radial expansion and also to prevent axial collapse of the root portions of the corrugations.

The construction of the end fitting means 28 and the manner in which the tubes and braids are secured thereto have been shown and described in considerable detail. The construction of the end fitting means 26 and the manner in which the tubes and braids are connected thereto are substantially the same as the construction of the end fitting means 28 and its connections to the tubes and braids. Thus, it suffices to state that the end fitting means is provided with an annular adapter member 92 welded to the pipe section 42 and also welded to the inner tube 58 and braid 66. The end fitting means 26 also has a flange member 94 welded to the pipe section 42 and having a reduced diameter portion welded to the outer corrugated tube 72 and the outer braid or sheath 80.

In accordance with an important feature of the present invention, the joint structure 20 is provided with novel means generally designated by the numeral 96 extending between and connected to the flange members 74 and 94 of the opposite end fittings for accommodating axial thrusts tending to separate the opposite end fittings while permitting the joint structure to accommodate radial deflections or vibrations. This means comprises a first group of wire cables or ropes or other suitable flexible elements 98 spaced around the corrugated tubes, and a second group of flexible tension accommodating elements 100 spaced around the corrugated tubes. The cables 98 are connected by fittings 102 and 104 at their opposite ends to the flange members 74 and 94, and the cables 100 are similarly connected by fittings 106 and 108 to the flange members 74 and 94. All of these fittings are substantially identical so that only one of them need be described in detail. As shown best in FIGS. 2 and 4, the fitting 102 comprises a threaded shank 110 adapted to extend through an aperture 112 in the flange member 74. Nut members 114 and 116 are disposed on opposite end portions of the threaded shank for engaging opposite sides of the flange member to locate and lock the shank positively with respect to the flange member. Preferably lock washers 118 and 120 are provided on the threaded shank between the nut members 114 and 116 respectively and the flange member. The threaded shank portion merges with an unthreaded shank portion 122 which extends diagonally with respect to the threaded shank portion for the purpose mentioned below. The free end of the unthreaded shank portion 122 is provided with annular means, not shown, for rotatably retaining a nut member 124. This nut member is adapted to receive a threaded end portion of a socket member 126. The socket member 126 receives and is crimped on an end portion of a cable so as to provide a secure connection between the cable and the fitting.

As shown best in FIG. 3, the fittings 102 and 106 are annularly spaced around the flange member 74 and the fittings 102 are radially spaced outwardly of the fittings 106. The corresponding fittings connected with the flange member 94 are similarly arranged. As a result, the flexible elements or cable 100 comprise an inner layer of flexible elements annularly spaced around the corrugated tubes, and the flexible elements or cables 98 comprise an outer layer of cables annularly spaced around the inner layer of cables. In addition it is to be noted that the diagonal shank portions of the fittings 102 and 106 are oppositely arranged as are the diagonal shank portions of the corresponding fittings connected with the flange member 94. As a result, the flexible elements or cables 98 extend diagonally or helically around the corrugated tubes and between the opposite end fitting means in one direction and the cables 100 extend diagonally or helically in the opposite direction. This arrangement of two layers of cables or tension accommodating elements diagonally or helically disposed in opposite directions is important since it enables the joint structure to accommodate radial deflection or vibration or axial misalignment of the opposite end fitting means of the structure without unduly stressing any of the tension accommodating elements. In other words, this arrangement of the tension accommodating elements prevents slackening of certain of the elements and increased loading of other elements at the opposite side of the tubing when the structure is radially deflected. It will be appreciated that while the diagonal or helical arrangement of the tension accommodating elements in the embodiment illustrated has been accomplished by providing the cable anchoring fitting with diagonal shank portions, similar results could be obtained with fittings having straight shanks extending through apertures diagonally formed in the flange members.

The flexible connection or joint 20 may be easily installed merely by bolting its opposite ends to the attachment flanges on the opposed pipe sections of the piping system. After such installation it is desirable to adjust the tension accommodating elements of the restraining means 96 so as to insure substantially uniform loading of these elements whereby more efficient operation or, in other words, a greater overall resistance to axial thrusts is obtained. When adjusting the tension accommodating elements, a relatively light fluid pressure is preferably built up in the piping system so as to place the tension accommodating elements under some load. Then the nut elements of each of the cable fittings 102 and 106 are adjusted by means of a torque wrench so as to place each of the cables under the same load or tension.

It is desirable to check the seals provided by each of the inner and outer corrugated tubes 58 and 72. The inner tube may be checked merely by introducing fluid under pressure into the piping system. In order to check the outer corrugated tube, a passageway 130 is provided through the flange member 74 for communication with the interior of the corrugated tube 72. Any suitable means such as a plug 132 may be provided for normally closing the passageway 130, which passageway may be connected with a suitable source of fluid under pressure when the plug is removed for checking the seal provided by the corrugated tube 72. If desired, a pressure gauge, not shown, may be connected with the passageway 130 so as to provide an indication of the pressure within the corrugated tube 72 and thereby provide means for determining whether or not the inner corrugated tube 58 is functioning properly.

FIGS. 5 and 6 show, in simplified form, a slightly modified construction of the present invention which is similar to the structure described above as indicated by the application of identical reference numerals with the suffix *a* added to corresponding elements. In this embodiment the cables or tension accommodating elements may be connected with the flange member 94a in the same manner as the corresponding elements of the embodiment described above. However, the flange member 74a is provided with diagonally formed apertures through which the cables 98a and 100a are inserted during assembly of the structure. Tension is then applied to these cables in the direction of the arrows shown in FIG. 5 for preloading or stressing the cables in a predetermined uniform manner, and the cables are then secured to the flange member 74a by welding as indicated at 134 and 136 in FIG. 6. It will be understood, that a further modification could be provided by welding the ends of the cables to the flange member 94a, if desired.

FIGS. 7–10 show another embodiment of the present invention similar to those described above as indicated by the application of identical reference numerals with the suffix *b* added to corresponding elements. In this embodiment, the flange member 74b is provided with radially inner and outer annular series of apertures 140 and 142 which have diameters slightly larger than the diameters of the flexible elements or cables 98b and 100b. These apertures may extend substantially parallel to the axis of the connector as shown or diagonally with respect to the axis of the connector for facilitating reception of the diagonally or helically disposed cables. The flange 94b is provided with identical radially outer and inner series of apertures 144 and 146. In this embodiment it is important to note that the cable or wire rope 98b is formed in a single length and is threaded through successive apertures in the outer series of apertures 140 and 144 in the end plates 74b and 94b so as to provide a plurality of integrally joined rope or cable sections extending between the flanges in the manner shown. The rope or cable 100b is similarly formed in one piece and is threaded through the apertures 142 and 146 so as to provide another group of integrally joined cable sections extending between the flanges 74b and 94b and diagonally or generally helically disposed oppositely from the sections of the rope 98b.

As shown, for example, in FIG. 10, the cables or wire ropes passing through one aperture in a flange are looped around the flange and threaded through an immediately adjacent aperture. The outer ends of all of the apertures are provided with enlarged mouths having rounded surfaces 148 so as to prevent undue abrasion of the wire ropes or cables. As the cable or wire rope 98b is threaded through the apertures in the opposing flanges 74b and 94b, each successive section of the cable extending between the flanges is placed under any desired tensioning load. When this cable has been inserted through all of the apertures in the outer series of apertures, opposite ends of the cable are welded or otherwise secured as indicated at 150 and 152 to the flange 74b as shown in FIGS. 8 and 9. The cable or wire rope 100 is similarly applied to the connector structure, and opposite ends of this cable are secured or welded to the flange 74b as at 154 and 156.

After the opposite ends of the wire ropes 98b and 100b have been secured, any substantial variation in the stresses or tension applied to the various sections of the rope is relieved since the ropes may slide freely through the apertures in the flanges 74b and 94b. It is also to be noted that this feature provides for continuing self-equalizing of stresses in the various rope sections when the connector is installed in a piping system and subjected to lateral deflections or vibrations. It will further be appreciated that the structure shown in FIGS. 7–10 is extremely simple and therefore may be produced easily and relatively economically. As a result of the extreme simplicity of this embodiment, additional layers of additional flexible elements or wire ropes may readily be added by extending the opposite end flanges and providing additional annular series of apertures so that the structure may easily be adapted for accommodating substantially any stresses.

FIG. 11 shows another slightly modified embodiment of the present invention which is similar to the above described structures as indicated by the application of identical reference numerals with the suffix *c* added to corresponding elements. This embodiment is substantially identical to the structures shown in FIGS. 7–10 except that opposite ends of each of the wire ropes or cables are connected by suitable turnbuckle devices 158, only one of which is shown. It will be appreciated that with this structure the tension in all sections of the cables may be controlled by adjusting the turnbuckles.

While the preferred embodiments of the present invention have been shown and described herein, it is obvious that many structural details may be changed without departing from the spirit and scope of the appended claims.

The invention is claimed as follows:

1. A flexible connector adapted for use in coupling axially spaced-apart pipe sections in a piping system subjected to comparatively high internal pressure, said connector comprising: a pair of axially spaced-apart and aligned end fittings for attachment to respective pipe sections, each of said fittings having a radially outwardly extending flange; flexible tube means affixed to said fittings radially inwardly of the periphery of the flanges thereof to define a fluid-carrying conduit between said fittings; a first plurality of flexible, rope-like, tension-accepting elements spiraled over the exterior of said tube means, said elements being disposed in spaced-apart, parallel relationship to extend between said flanges in a generally diagonal direction; a second plurality of flexible, rope-like, tension-accepting elements spiraled over the outermost portions of said first elements, said second elements being disposed in spaced-apart, parallel relationship to extend between said flanges in a substantially opposite, generally diagonal direction; and progressively lengthenable and shortenable fastening means connecting the ends of said elements to the adjacent flanges of said fitting for individually regulating the tension in said elements.

2. A flexible connector according to claim 1 wherein said first and second elements are of substantially circular transverse section.

3. A flexible connector according to claim 1 wherein said tube means includes a first tube defining a primary, fluid-carrying conduit and a second tube coaxial with and surrounding said first tube, said second tube maintaining a fluid-tight connection in the event of failure in said first tube.

References Cited in the file of this patent

UNITED STATES PATENTS

| | | |
|---|---|---|
| 993,934 | Witzenmann | May 30, 1911 |
| 1,586,725 | Westinghouse | June 1, 1926 |
| 1,736,923 | Lalonde | Nov. 26, 1929 |
| 1,763,574 | Williams | June 10, 1930 |
| 1,993,984 | Wulle | Mar. 12, 1935 |
| 2,216,468 | Farrar | Oct. 1, 1940 |
| 2,314,776 | Dittus | Mar. 23, 1943 |
| 2,444,988 | Guarnaschelli | July 13, 1948 |
| 2,666,657 | Howard | Jan. 19, 1954 |
| 2,667,370 | Clarke | Jan. 26, 1954 |
| 2,707,972 | Cole | May 10, 1955 |

(Other references on following page)

| | UNITED STATES PATENTS | | | FOREIGN PATENTS | |
|---|---|---|---|---|---|
| 2,821,414 | Jensen | Jan. 28, 1958 | 48,222 | Austria | Feb. 16, 1889 |
| 2,867,242 | Harris | Jan. 6, 1959 | 114,806 | Great Britain | Apr. 18, 1918 |
| 2,894,535 | Hansen | July 14, 1959 | 594,620 | Great Britain | Nov. 14, 1947 |
| 2,898,940 | Cole | Aug. 11, 1959 | 258,088 | Switzerland | May 2, 1949 |
| 2,954,990 | Binns | Oct. 4, 1960 | 262,058 | Switzerland | Sept. 16, 1949 |
| 2,969,247 | Eggmann | Jan. 24, 1961 | 1,140,522 | France | Mar. 4, 1957 |